May 21, 1929.  G. CANNISTRA  1,714,416
AIRCRAFT
Filed June 27, 1927  4 Sheets-Sheet 1
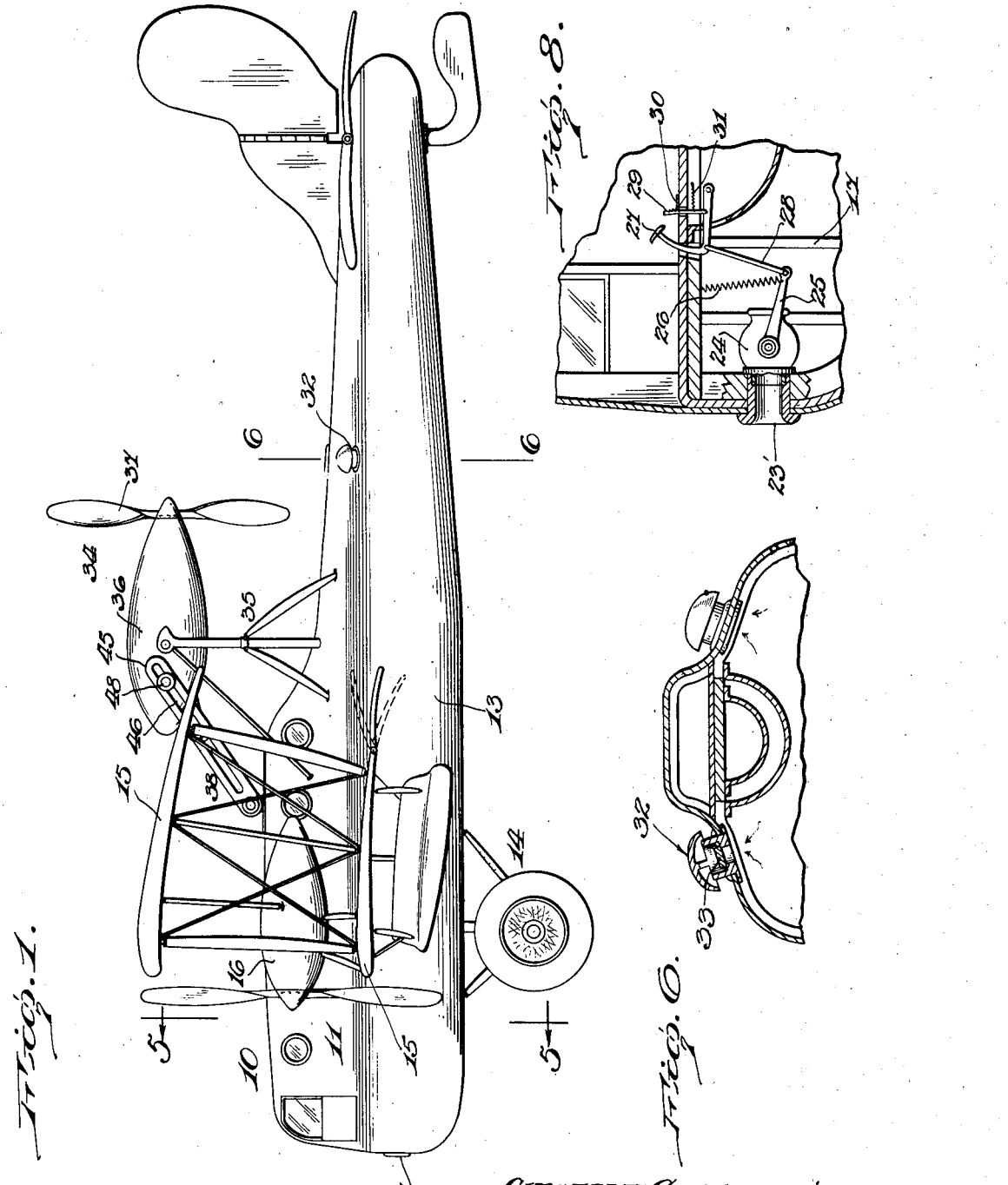
GIUSEPPE CANNISTRA
INVENTOR

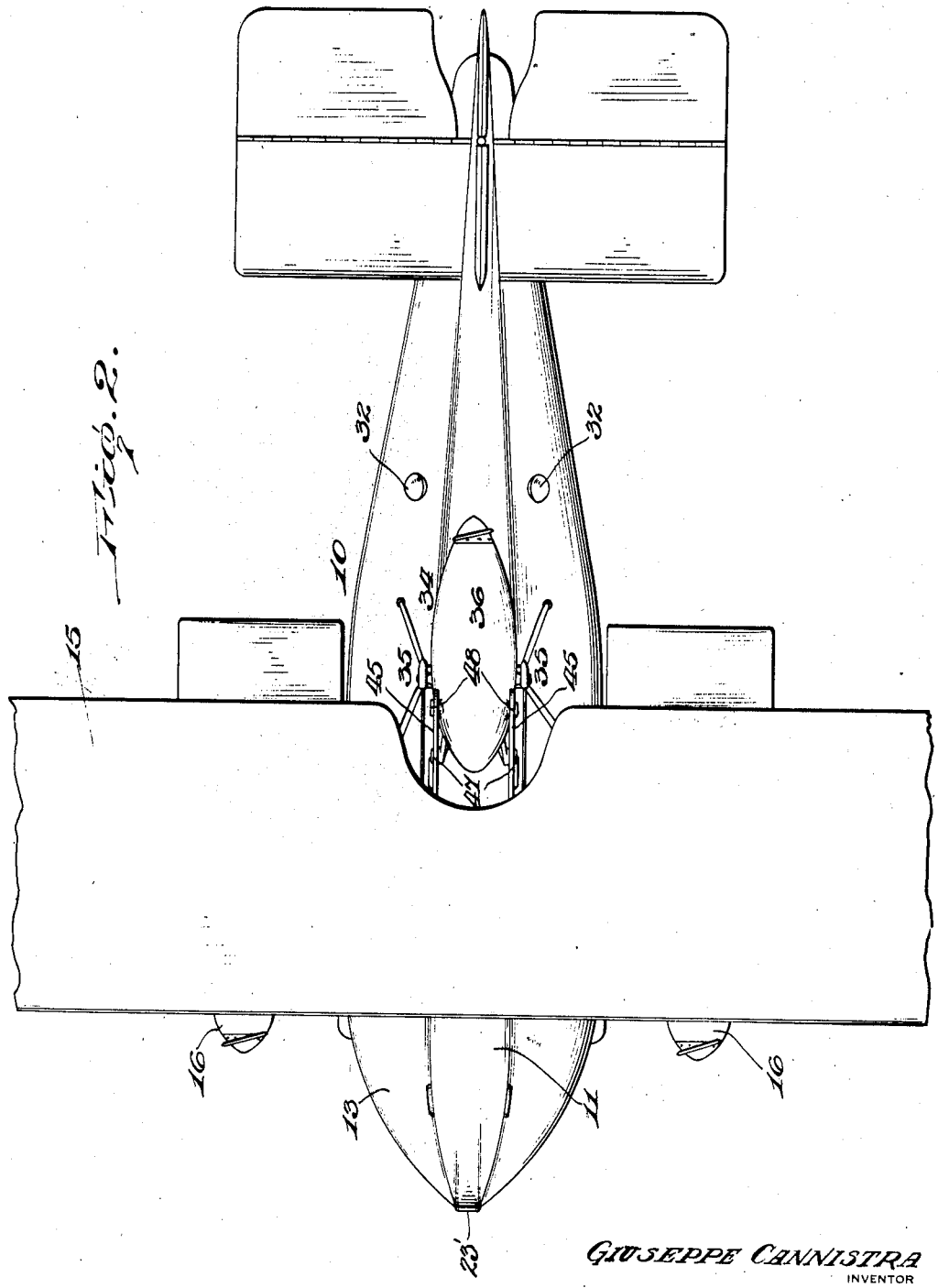

May 21, 1929.   G. CANNISTRA   1,714,416
AIRCRAFT
Filed June 27, 1927   4 Sheets-Sheet 3
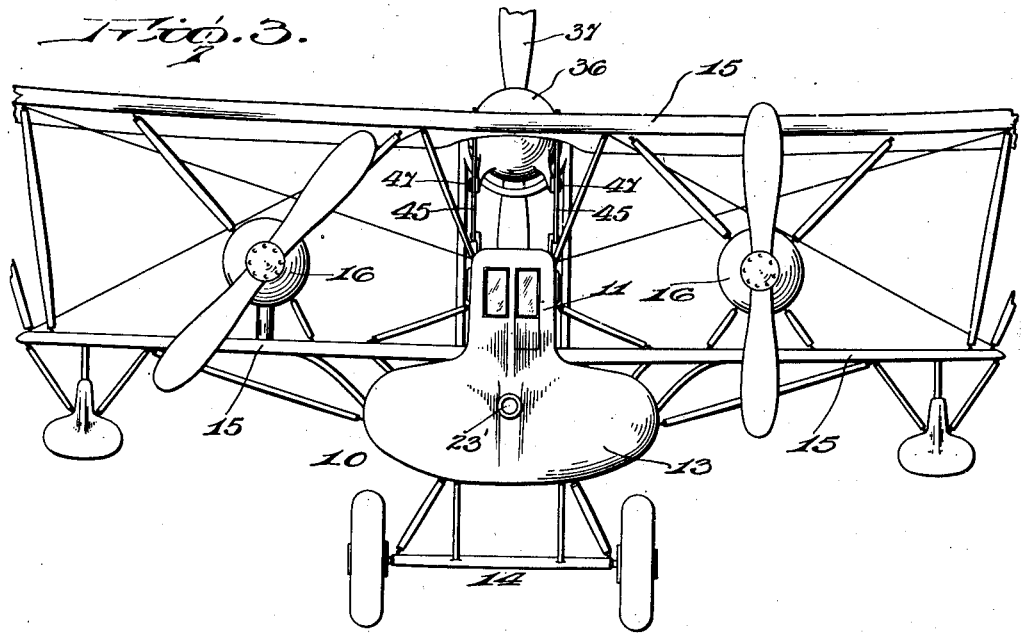
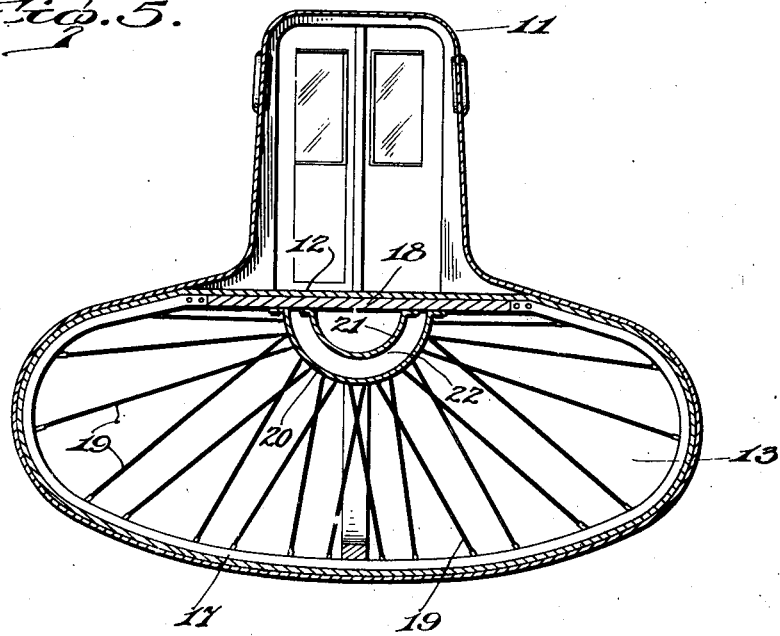
GIUSEPPE CANNISTRA
INVENTOR
BY Victor J. Evans
ATTORNEY May 21, 1929.　　　　G. CANNISTRA　　　　1,714,416
AIRCRAFT
Filed June 27, 1927　　　4 Sheets-Sheet 4
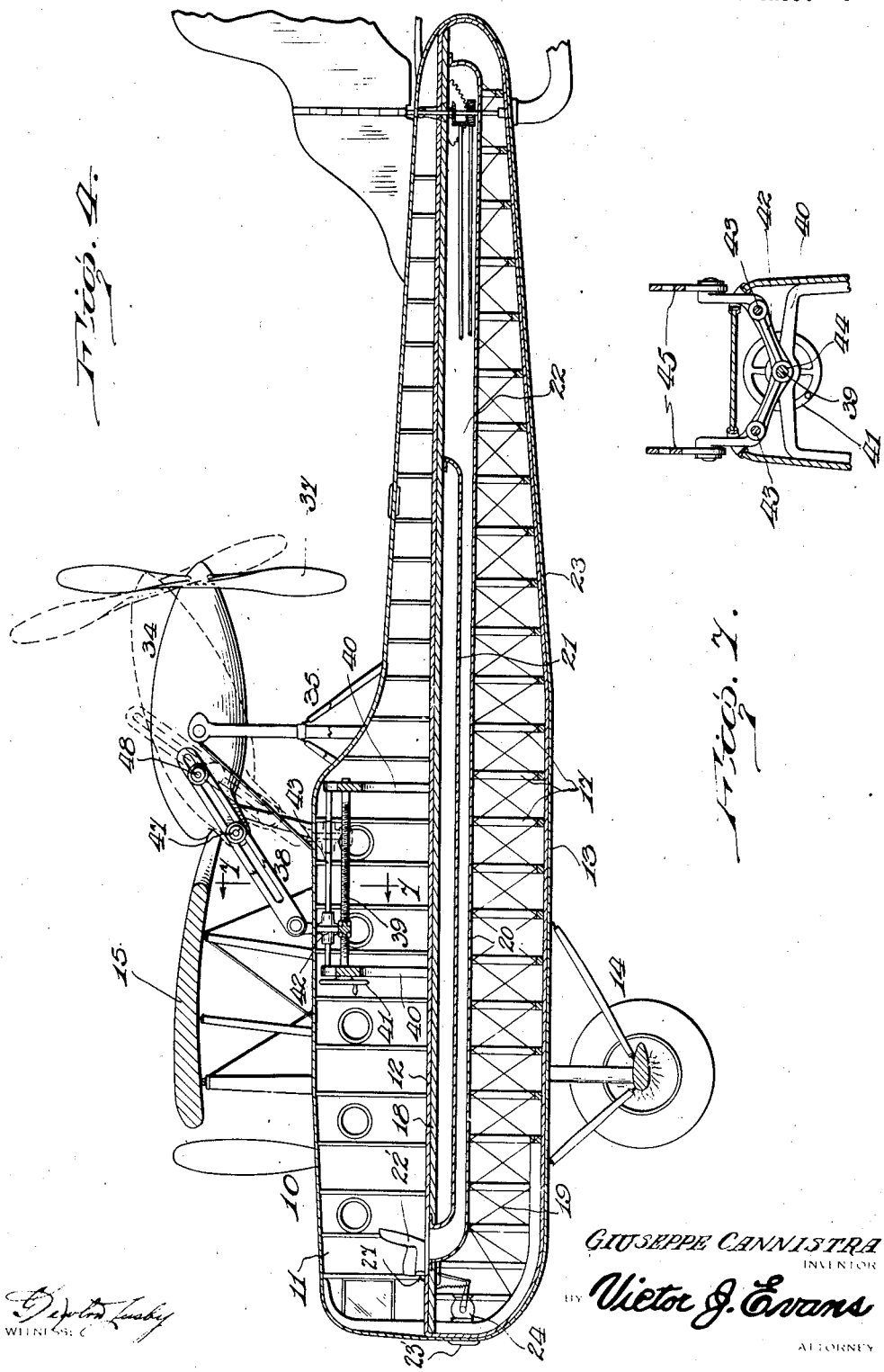
GIUSEPPE CANNISTRA
INVENTOR
BY Victor J. Evans
ATTORNEY Patented May 21, 1929.

1,714,416

UNITED STATES PATENT OFFICE.

GIUSEPPE CANNISTRA, OF BRONX, NEW YORK.

AIRCRAFT.

Application filed June 27, 1927. Serial No. 201,831.

This invention relates to aircraft and particularly to the heavier than air type and is an improvement over the structure shown and described in my U. S. Letters-Patent #1,332,801, dated March 2nd, 1920.

The primary object of the invention resides in a flying machine for use in landing on either land or water, the same having the usual ground landing gear in combination with a buoyant understructure which may be opened to the atmosphere to allow a free passage of air therethrough to reduce the air resistance while in flight.

Another object of the invention is to provide an aeroplane with an air compartment beneath the cabin or fuselage and from which the landing gear is supported, the walls of the air chamber being flexible to absorb shock when the landing gear comes in contact with the ground.

Another object is the provision of an aeroplane having a power plant for propelling the machine horizontally through the air, and an auxiliary power plant mounted at the center of gravity of the machine which may be tilted to various positions from a suitable control means operable from the pilot cabin when descending.

A further object is to provide an aeroplane with a buoyant understructure through which a current of air may pass to reduce the resistance of the machine when flying, and which is controlled by the actuation of a foot controlled valve for regulating the flow of air therethrough.

With these and other objects in view, the invention resides in certain novel construction and combination and arrangement of parts, the essential features of which are hereinafter fully described, are particularly pointed out in the appended claims, and are illustrated in the accompanying drawing, in which :—

Figure 1 is a side elevation of my improved flying machine.

Figure 2 is a top plan view of the same.

Figure 3 is a front elevation of the same.

Figure 4 is a vertical longitudinal sectional view therethrough.

Figure 5 is a vertical transverse sectional view on the line 5—5 of Figure 1.

Figure 6 is a similar view on the line 6—6 of Figure 1.

Figure 7 is a detail horizontal sectional view on the line 7—7 of Figure 4.

Figure 8 is an enlarged detail sectional view through the air control valve and its operating mechanism.

Referring more particularly to the drawings, the reference numeral 10 designates my improved aircraft in its entirety which includes a cabin or fuselage structure 11 extending the length thereof, the flooring 12 thereof serving to divide the same into a buoyant understructure 13, from the under-side of which the usual landing gear 14 is suspended. The machine shown in the drawings is a biplane having spaced wings 15 extending from opposite sides of the body and which wings support power plants 16 respectively disposed on opposite sides of the cabin for propelling the machine in a forward direction. The machine is provided with the usual ailerons, elevators and rudder and their operating mechanism, but a description of these parts is not believed necessary.

The buoyant understructure 13 is substantially elliptical in cross section to provide a relatively broad flat structure but merges into the cabin structure as clearly shown in Figure 5 of the drawings. The understructure 13 is constructed of suitably spaced transverse ribs 17 which are of a shape corresponding to the cross sectional configuration of the understructure but which gradually decrease in size from the front to the tail end of the machine. The free ends of the ribs are fixed to the sides of an anchor plate 18 which extends the length of the machine. The ribs define a flexible skeleton structure as the same are constructed of spring metal capable of yielding under shock. Brace wires 19 have one of their ends fixed to the ribs while their other ends are fixed to a semi-circular shaped plate 20 which is bolted to the underside of the anchor plate 18 and which extends the length thereof. A similar shaped plate 21 is also fixed to the plate 18 within spaced relation to the plate 20 to provide an enclosed passage 22 for the cables leading from the various operating parts to the control apparatus adapted to be arranged within reach of an operator when seated in the pilot seat 22' arranged at the forward end of the cabin. The skeleton frame formed by the ribs is covered by a waterproof casing 23 to provide a water tight air chamber.

From the description thus far, it will be seen that by reason of the peculiar shape of the buoyant understructure in cross section, and the resilient nature of the rib, the same will absorb any shock incident to a ground landing, when the landing gear comes in contact with the ground. The action of the understructure is similar to the well known action of the elliptical spring. Under shock, the understructure will yield and tend to flatten out, but will always return to normal position.

For reducing the head resistance of the craft, I provide a means whereby air may freely pass therethrough and to this end, I provide an air inlet opening 23' in the nose or front of the understructure through which the admission of air is controlled by a valve 24. The actuating arm 25 of the valve is normally held in an open position by a contractile spring 26 but which valve may be manually closed when desired by the actuation of a foot pedal 27 connected to the arm 25 by a link 28. For maintaining the foot pedal in a depressed position to hold the valve closed against the action of the spring 26, I provide the pedal with a pivoted ratchet bar 29 held in engagement with a keeper plate 30 by a spring 31. To release the foot pedal from a depressed position, it is only necessary to kick the ratchet bar to disengage the keeper plate whereupon the spring 26 will return the valve and operating parts to normal position. Air discharge openings 32 are provided at the rear of the air chamber above the water line and which are normally closed by flap valves 33. It will be seen that when the valve 24 in open position, a free draft of air passes through the understructure as the force of the draft automatically opens the flap valves 33. However, when it is desired to increase the head resistance, the operator actuates the foot control valve mechanism to close the valve and in so doing builds up the resistance of the craft.

Mounted rearward of the machine is an auxiliary power plant 34 which comprises a supporting frame 35 in which the motor 36 is pivotally mounted. The normal position of the motor is shown in full lines in Figure 4 of the drawings, at which time the same is on a horizontal plane with the propeller 37 facing toward the rear. When the propeller is in this position, it can be used for aiding in bringing the machine to a stop when landing or for propelling the machine in a rearward direction after landing. However, the motor may be turned upon its pivot for changing the angle of the axis of the propeller and may be moved over an arc from a horizontal to various angular positions.

For moving the motor to various angular positions, I provide an actuating mechanism 38 which comprises a worm or screw 39 journalled for rotation in suitably spaced bearing brackets 40 within the cabin to one end of which a hand wheel 41 is fixed. A carriage 42 is slidably mounted on rails 43 and is provided with a threaded bore 44 for coaction with the worm or screw 39. Levers 45 are pivoted to opposite sides of the carriage and are slotted as at 46 for the major portion of their lengths. Headed pins 47 and 48 extend from opposite sides of the motor casing and pass through the slots 46. It will be appreciated that when the wheel 41 is turned in one direction the carriage 42 will be fed in one direction on a horizontal plane which will move the tail end of the motor by reason of the pin and slot connections. By rotating the wheel 41 in an opposite direction, an opposite movement will be imparted to the motor. When the motor is swung to different angular positions, the same may be effectively used in descending by setting up a braking action upon the machine.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In an aircraft having a cabin structure, a hollow air compartment disposed beneath and extending beyond the sides of said cabin structure, said air compartment having an air inlet opening at the front thereof and discharge openings adjacent the rear thereof to permit a free passage of air therethrough, manually operated means for closing said inlet opening, and automatic means for closing said discharge openings when the air pressure in said air chamber reaches a predetermined degree after the actuation of said manually operated means.

2. In an aircraft having a cabin structure, a hollow air compartment disposed beneath said cabin structure, said air compartment having an air inlet opening at the front thereof and discharge openings adjacent the rear thereof to permit a free passage of air therethrough, manually operated means for closing said inlet opening, said manually operated means including an air control valve normally held in an open position and a foot actuated pedal for closing said valve, and automatic means for closing said discharge openings when the air pressure in said air chamber reaches a predetermined degree after said valve has closed.

3. In an aircraft having a cabin structure, and a resilient understructure disposed therebeneath and substantially elliptical in cross section to extend from opposite sides of said cabin structure.

4. In an aircraft having a cabin structure, and a resilient hollow buoyant understructure disposed therebeneath and substantially elliptical in cross section to extend from opposite sides of said cabin structure.

In testimony whereof I have affixed my signature.

GIUSEPPE CANNISTRA.